April 6, 1954  F. T. BLAYDES  2,674,168
POWER-LIFT MECHANISM

Filed Nov. 16, 1949  2 Sheets-Sheet 1

Inventor:
Frederick T. Blaydes
Paul O. Pippel
Atty.

April 6, 1954   F. T. BLAYDES   2,674,168
POWER-LIFT MECHANISM
Filed Nov. 16, 1949   2 Sheets-Sheet 2
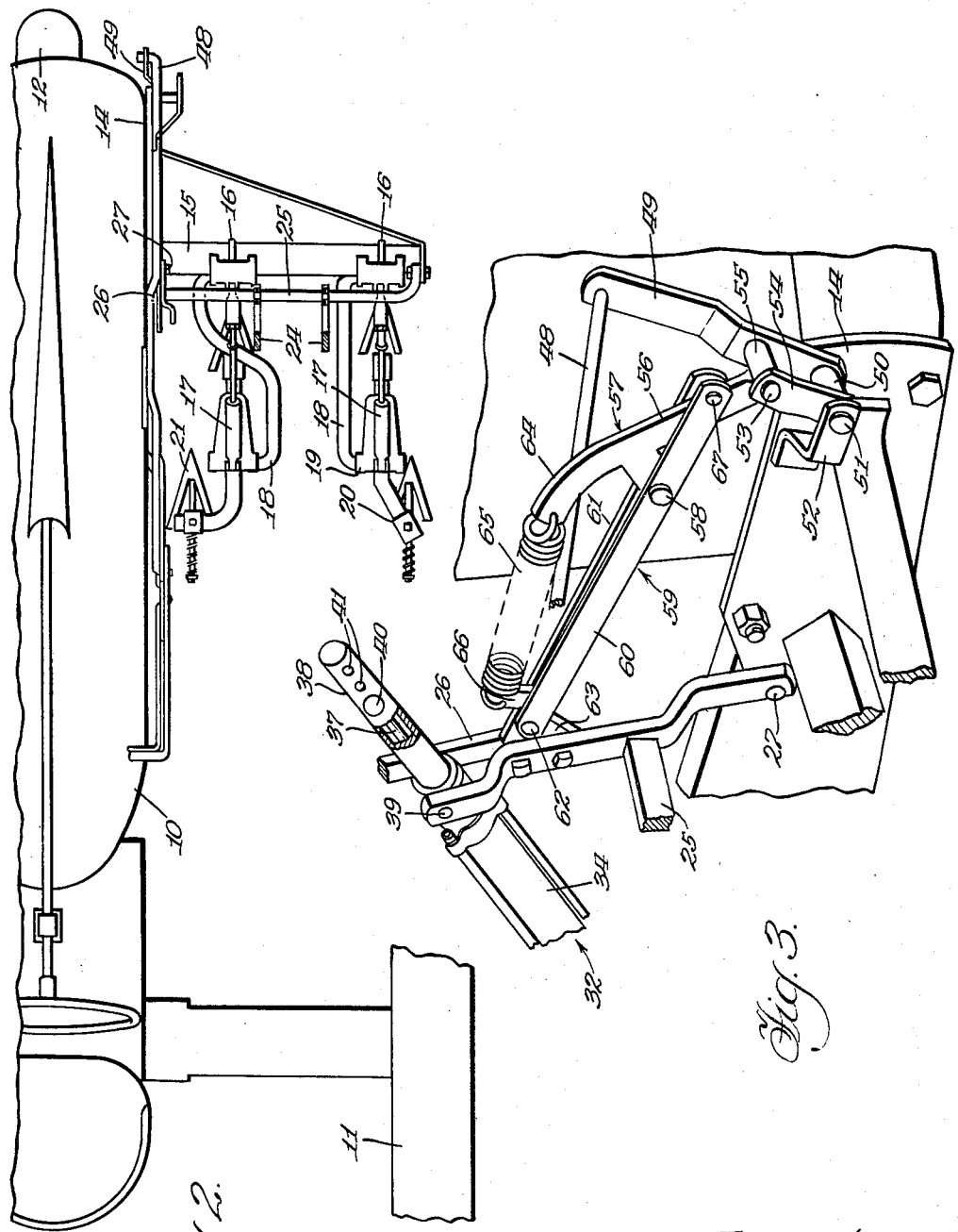
Inventor:
Frederick T. Blaydes
Paul O. Pippel
Atty.

Patented Apr. 6, 1954

2,674,168

UNITED STATES PATENT OFFICE 2,674,168

POWER-LIFT MECHANISM

Frederick T. Blaydes, Canton, Ill., assignor to International Harvester Company, a corporation of New Jersey Application November 16, 1949, Serial No. 127,563

7 Claims. (Cl. 97—46.55)

This invention relates to agricultural implements and particularly to lifting mechanism therefor. More specifically, the invention concerns lifting mechanism for an agricultural implement incorporating means for lifting the implement to a constant height irrespective of variations made in the operating position of the implement.

In an agricultural implement such, for example, as the tractor-mounted cultivator with which this invention is concerned, it is frequently necessary to adjust the operating depth of the cultivator shovels in the ground and it is also important that when the implement is raised to its transport position it be lifted to the same height every time. Before the advent of constant height lifting devices for implements a cultivator shovel which was adjusted to operate at its maximum depth in the ground would not be raised as high upon the machine by which it was transported as would be the case if the shovels were operating at a shallower depth.

An important object of the present invention is to provide an improved constant height lift for a tractor-mounted implement.

Another object of the invention is to provide in an agricultural implement an improved means for adjusting the depth of operation of the implement while assuring the lifting of the implement to a constant height above the ground irrespective of the operating depth of the tools.

Another object of the invention is to provide for use in combination with a hydraulic ram unit, mechanism utilizing the full stroke of the ram unit in raising the implement in transport position while providing means for adjusting the implement independently of the ram unit.

Other objects and advantages of the invention will become clear from the following detailed description when read in conjunction with the accompanying drawings wherein:

Fig. 2 is a plan view of a portion of the structure shown in Fig. 1 with parts removed for clarity illustrating only one side of the tractor.

Fig. 3 is a view in perspective of the lifting mechanism of this invention.

Figure 1:
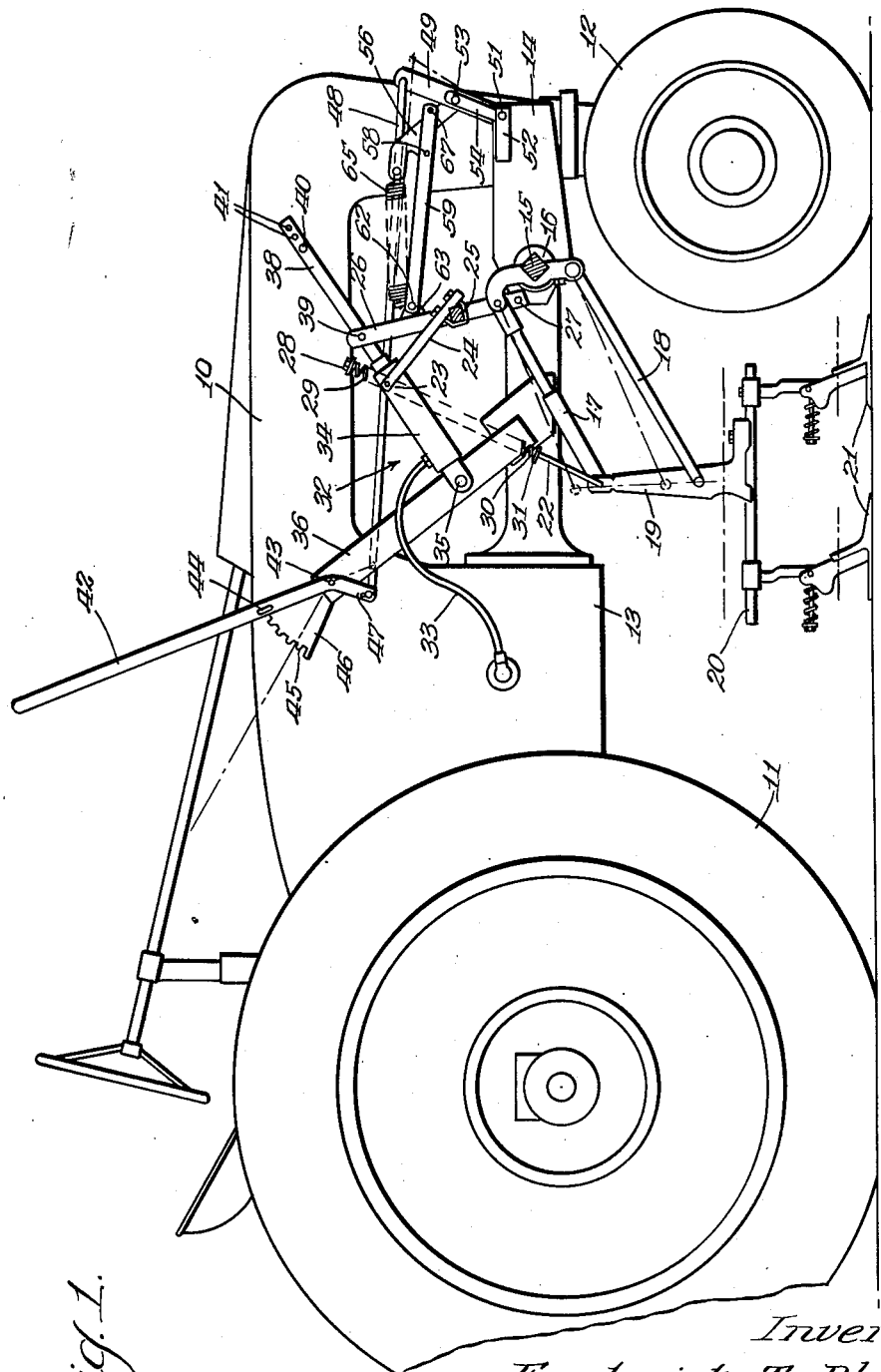
Figure 1 is a view in side elevation of a tractor having mounted thereupon partly in section a cultivator adapted to be raised and lowered by mechanism incorporating the features of the present invention and showing in dotted lines an adjusted position of the implement.

Referring to the drawings, the tractor incorporating the present invention is designated by the numeral 10 and is provided with a pair of spaced rear drive wheels 11 (only one of which is shown), front wheels 12, and a power plant 13.

The front end of the tractor at each side thereof is provided with a plate 14 to which is affixed a laterally extending square tool bar 15 having mounted thereupon one or more spaced brackets 16. Each of the brackets 16 has pivotally connected thereto at vertically spaced locations a pair of generally parallel links 17 and 18, the rear ends of which are pivotally connected to an upstanding bracket 19 to the base of which is connected a tool gang 20 carrying cultivator shovels 21.

Each pair of parallel links 17 and 18 is raised and lowered with respect to the tractor in order to move the tool gangs between operating and transport positions by a rod 22 connected to the bracket 19 at its lower end and having its upper end slidably received in a swivel 23 carried at the end of an arm 24 mounted upon a bail 25 pivotally mounted at one end upon the end of tool bar 15 and at its other end secured to a generally upwardly and rearwardly extending lever arm 26 pivoted at 27 upon the plate 14. The upper end of rod 22 is provided with an adjusting nut 28. A spring 29 surrounds the rod 22 between swivel 23 and the nut 28 and another spring 30 surrounds the rod between the swivel 23 and a collar 31. These springs serve as hold-down springs and to absorb shocks to the tool in transport position.

Lifting power for vertically moving the tool gangs between operating and transport positions is provided by a hydraulic ram unit 32. This unit is preferably of the one-way type and receives fluid under pressure through a hose line 33 from a source, not shown, receiving power from the tractor power plant. Ram unit 32 comprises a cylinder 34 pivotally mounted at 35 upon a bracket 36 affixed to the side of the tractor. A piston rod 37 is slidable in the cylinder and is receivable for relative sliding movement in a tube or sleeve member 38 supported at one end in trunnion 39 carried by the lever 26.

Upon forcing fluid under pressure through hose 33 into the cylinder 34 piston 37 is extended until the end thereof engages a stop or abutment in the form of a pin 40 extending through the sleeve 38 in one of several openings 41 provided therein for this purpose. At this point it should be clear that upon extension of the piston in the cylinder until the end thereof engages pin 40 the lever 26 will be rocked forwardly, rocking the bail 25 and through rod 22 lifting the parallel links 17 and 18 and the tool gangs supported thereby. The tools are raised until the ram unit has reached the end of its stroke and the working tools are in transport position. Upon return of the fluid to the tractor source the piston rod 37 is retracted within the cylinder and away from contact with the pin 40.

A manual adjustment for the operating depth of the tools in the ground is provided by mechanism which includes an adjusting member or lever 42 pivoted at 43 upon the bracket 36 and provided with a detent 44 engageable in notches 45 in a quadrant 46 provided at the upper end of the bracket 36. An arm 47 of the lever on the opposite side of the pivot 43 is connected by a rod 48 with a rock arm 49 secured at its lower end to a sleeve 50 mounted upon a pin 51 secured to the plate 14 and braced by an angle member 52.

Another pin 53 vertically spaced above pin 51 is carried by rock arm 49 and its end is braced by a strap 54 connecting the ends of pins 51 and 53. A spacer 55 surrounds the pin 53 and has secured thereto as by welding one arm 56 of a crank 57 pivotally connected at 58 to a link 59 comprising a pair of link members 60 and 61, the rearward ends of which are pivoted upon a pin 62 carried upon a lug 63 secured to lever 26. Links 57 and 59 thus form an articulated connection between the rock arm 49 and the lever 26.

Another arm 64 of the crank 57 extending on the other side of pivot 58 is connected by an extension spring 65 with a lug 66 secured to the link 59 between the members 60 and 61.

In the position of the parts shown clearly in Figs. 1 and 3, the pivot pin 58 is above a line drawn between the pivot axes of the pins 53 and 62. The spring 65 tends to urge the pivot 58 toward this center line thus urging lever 26 rearwardly and tool gangs 20 downwardly. A stop is provided in the form of a pin 67 carried between the ends of link members 60 and 61 on the side of pivot 58 opposite the pin 62 and this pin 67 is arranged to engage the upper edge of the crank 57 to limit the downward movement of the pivot 58. Movement of the rock arm 49, therefore, to adjust the implement to selected positions by manipulating the adjusting lever 42 is transmitted through the linkage formed by the crank 57 and link 59 to the lever 26 to move the latter forwardly or rearwardly and thus affect the operating depth of the cultivator shovels 21. At the same time, floating movement of the shovels 21 is accommodated and when piston rod 37 in cylinder 34 is extended to rock the lever 26 forwardly, this is accomplished against the action of the spring 65, crank 57 pivoting about the pin 58 and moving away from the stop formed by the pin 67.

Since the piston rod 37 is not connected to the lever 26 and raises the implement by virtue of its engagement with the pin 40 in the sleeve 38, and further, since the piston rod 37 is retracted within the cylinder 34 when the implement is in its operating position, the operator is free to adjust the depth and move the lever 26, and with it the sleeve 38, with respect to the cylinder and the piston to adjust the operating depth of the earthworking tools. Regardless of the depth setting of the tools, the stroke of the piston 37 in the cylinder remains the same and the height of the tools in transport position remains the same. This height may be varied somewhat by placing the pin stop 40 in another of the openings 41 in the sleeve 38.

It is believed that the constant height lift mechanism of the present invention will be clearly understood from the foregoing description. Modifications, however, may be made without departing from the spirit thereof or the scope of the appended claims.

What is claimed is:

1. In lift mechanism for a tractor-mounted implement, a lifting lever pivoted on the tractor and connected to the implement, a power cylinder mounted on the tractor having a piston rod, a connection between the piston rod and the lever comprising guide means on the lever adapted to slidably receive and guide the said piston rod, a stop in said connection engageable by said rod during extension thereof to raise the implement to an extent determined by the stroke of the piston, said piston rod being retractable out of engagement with the stop to lower the implement, and means for moving the lever and therefore the stop independently of the cylinder and piston to vary the operating depth of the implement without altering the stroke of the piston and therefore the height to which the implement is lifted comprising a rock arm on the tractor, means for selectively adjusting and holding said rock arm in positions corresponding to changes in operating depth of the implement, and connecting linkage between said rock arm and said lever for transmitting adjustment of the rock arm thereto.

2. In lift mechanism for a tractor-mounted implement, a lifting lever pivoted on the tractor and connected to the implement, a power cylinder mounted on the tractor having a piston rod, a connection between the piston rod and the lever comprising guide means on the lever adapted to slidably receive and guide the said piston rod, a stop in said connection engageable by said rod during extension thereof to raise the implement to an extent determined by the stroke of the piston, said piston rod being retractable out of engagement with the stop to lower the implement, and means for moving the lever and therefore the stop independently of the cylinder and piston to vary the operating depth of the implement without altering the stroke of the piston and therefore the height to which the implement is lifted comprising a rock arm on the tractor, means for selectively adjusting and holding said rock arm in positions corresponding to changes in operating depth of the implement, and connecting linkage between said rock arm and said lever for transmitting adjustment of the rock arm thereto, said connecting linkage comprising articulated links to accommodate lifting of the implement independently of operation of said rock arm.

3. In lift mechanism for a tractor-mounted implement, a lifting lever pivoted on the tractor and connected to the implement, a power cylinder mounted on the tractor having a piston rod, a connection between the piston rod and the lever comprising guide means on the lever adapted to slidably receive and guide the said piston rod, a stop in said connection engageable by said rod during extension thereof to raise the implement to an extent determined by the stroke of the piston, said piston rod being retractable out of engagement with the stop to lower the implement, and means for moving the lever and therefore the stop independently of the cylinder and piston to vary the operating depth of the implement without altering the stroke of the piston and therefore the height to which the implement is lifted comprising a rock arm on the tractor, means for selectively adjusting and holding said rock arm in positions corresponding to changes in operating depth of the implement, and a connection between said rock arm and said lever for transmitting adjustment of the rock arm thereto, said connection including pivoted links and a stop to prevent the movement of the pivotal connection therebetween over a center line between the connections of the links to the lever and the rock arm.

4. In lift mechanism for a tractor-mounted implement, a lifting lever pivoted on the tractor and connected to the implement, a power cylinder mounted on the tractor having a piston rod, a connection between the piston rod and the lever comprising guide means on the lever adapted to slidably receive and guide the said piston rod, a stop in said connection engageable by said rod during extension thereof to raise the implement to an extent determined by the stroke of the piston, said piston rod being retractable out of engagement with the stop to lower the implement, and means for moving the lever and therefore the stop independently of the cylinder and piston to vary the operating depth of the implement without altering the stroke of the piston and therefore the height to which the implement is lifted comprising a rock arm on the tractor, means for selectively adjusting and holding said rock arm in positions corresponding to changes in operating depth of the implement, and a connection between said rock arm and said lever for transmitting adjustment of the rock arm thereto, said connection including pivoted links and a stop to prevent the movement of the pivotal connection therebetween over a center line between the connections of the links to the lever and the rock arm and a spring urging the pivotal connection between said links to said center line.

5. In lift mechanism for a tractor-mounted implement, a lever carried by the tractor and connected to the implement, said lever being movable to raise and lower the implement, a guide member having an abutment carried by the lever and movable therewith, a power cylinder on the tractor deriving power therefrom, a piston rod in the cylinder slidably receivable in said guide and engageable with said abutment to move the lever and raise the implement in response to extension of the piston rod, and means for adjusting the lever independently of the cylinder and piston to regulate the operating position of the implement, comprising a rock arm carried by the tractor, an adjusting member mounted on the tractor and operatively connected to the rock arm for selectively adjusting the position of said rock arm relative to the lever and holding it in adjusted position, and a connection between said arm and said lever for regulating the operating position of the implement in response to actuation of said adjusting member comprising connecting link means capable of transmitting motion from the rock arm to the lever, but yieldable to accommodate independent movement of the lever.

6. In lift mechanism for a tractor-mounted implement, a lever carried by the tractor and connected to the implement, said member being movable to raise and lower the implement, a guide member having an abutment carried by the lever and movable therewith, a power cylinder on the tractor deriving power therefrom, a piston rod in the cylinder slidably receivable in said guide and engageable with said abutment to move the lever and raise the implement in response to extension of the piston rod, and means for adjusting the lever independently of the cylinder and piston to regulate the operating position of the implement, comprising a rock arm carried by the tractor, an adjusting member mounted on the tractor and operatively connected to the rock arm for selectively adjusting the position of said rock arm relative to the lever and holding it in adjusted position, and a connection between said arm and said lever for regulating the operating position of the implement in response to actuation of said adjusting member comprising a pair of articulated links pivotally connected to said arm and said lever, and spring means for resisting relative pivoting of said links in one direction.

7. In lift mechanism for a tractor-mounted implement, a lever carried by the tractor and connected to the implement, said lever being movable to raise and lower the implement, a guide member having an abutment carried by the lever and movable therewith, a power cylinder on the tractor deriving power therefrom, a piston rod in the cylinder slidably receivable in said guide and engageable with said abutment to move the lever and raise the implement in response to extension of the piston rod, the position of the abutment in said guide being adjustable to vary the effective stroke of said piston, and means for adjusting the lever independently of the cylinder and piston to regulate the operating position of the implement, comprising a rock arm carried by the tractor, an adjusting member mounted on the tractor and operatively connected to the rock arm for selectively adjusting the position of said rock arm relative to the lever and holding it in adjusted position, and connecting linkage between said arm and said lever for regulating the operating position of the implement in response to actuation of said adjusting member.

References Cited in the file of this patent

UNITED STATES PATENTS

| Number | Name | Date |
| --- | --- | --- |
| 2,156,570 | Lindgren | May 2, 1939 |
| 2,283,377 | Lindgren et al. | May 19, 1942 |
| 2,309,203 | Morkoski | Jan. 26, 1943 |
| 2,319,492 | Dewey | May 18, 1943 |